INVENTORS.
Machiel Pardoel
Lodwijk Oosterveen

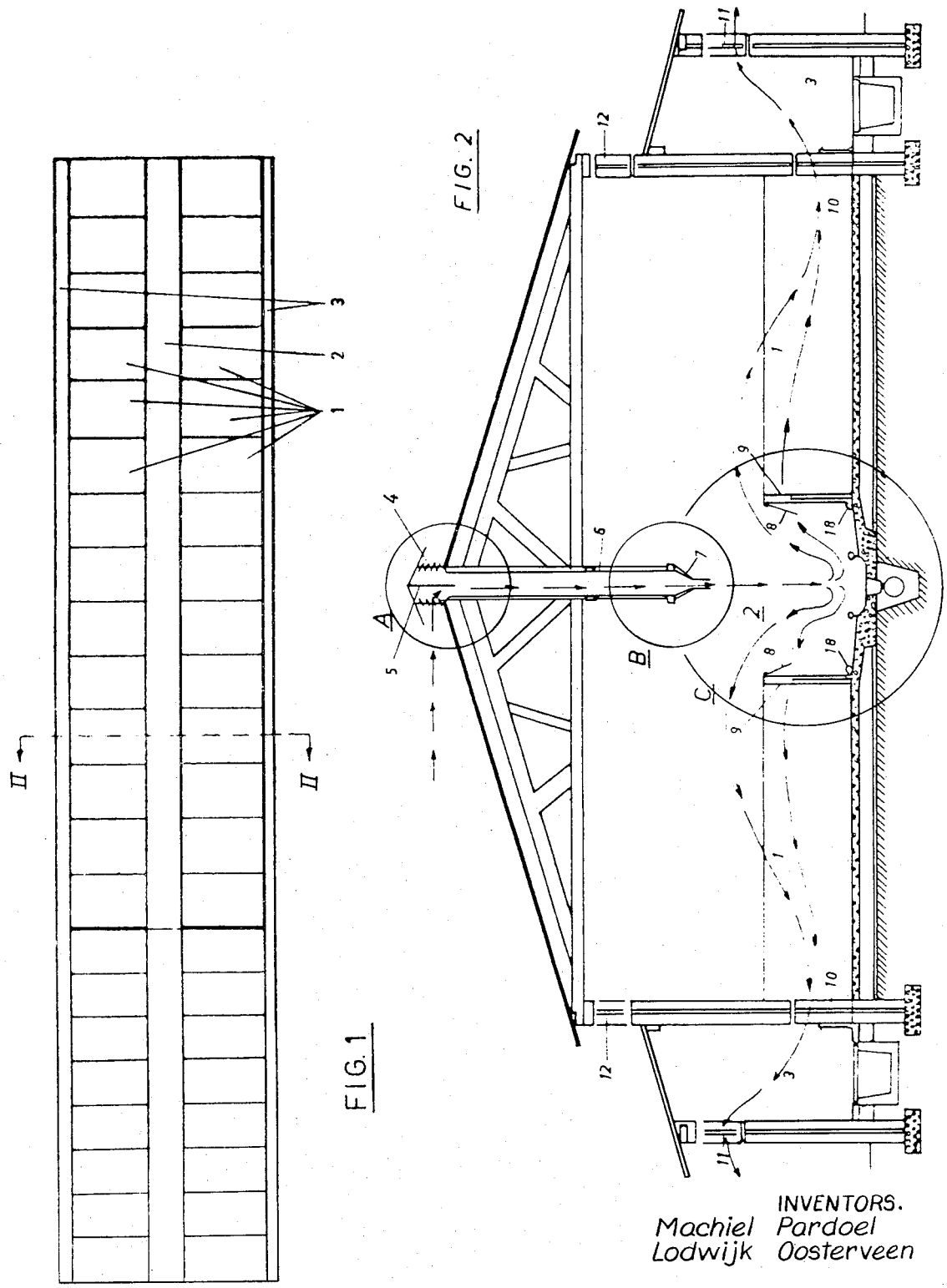

INVENTORS.
Machiel Pardoel
Lodwijk Oosterveen

United States Patent Office 3,694,222
Patented Sept. 26, 1972

3,694,222
APPARATUS FOR AERATING CATTLE SHEDS, PARTICULARLY PIGSTIES
Machiel Pardoel, Vlerdseweg E 211, Bruchem, Netherlands, and Lodewijk Oosterveen, Teisterbandstraat 48-B, Kerkdriel, Netherlands
Continuation of abandoned application Ser. No. 725,718, May 1, 1968. This application Feb. 5, 1971, Ser. No. 113,051
Int. Cl. F24f 13/06
U.S. Cl. 98—33 R    2 Claims

ABSTRACT OF THE DISCLOSURE

A method and apparatus for aerating a cattle shed wherein fresh air is drawn into the shed from an inlet above the floor, conducted downwardly from the inlet through a conduit and accelerated at a distance above the floor, and drawn across the floor at a desired level thereabove toward an outlet in a sidewall of the shed. A constricted passage at the lower end of the conduit effects acceleration of the fresh air as it is drawn therethrough toward the floor, and three species of the apparatus embody alternative inlet constructions and locations therefor.

---

Figure 3:
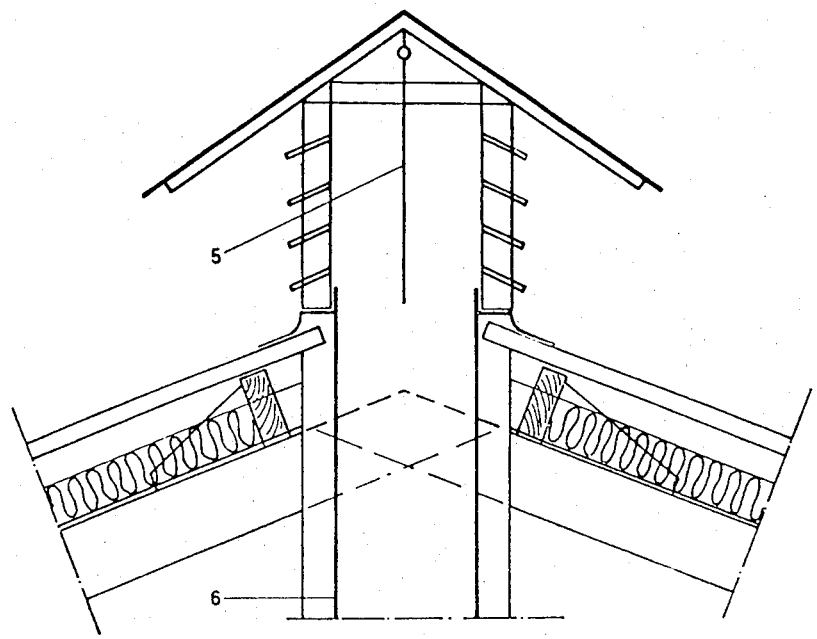

This application is a continuation of application No. 725,718, filed May 1, 1968, now abandoned.

The invention relates to a method of aerating cattle sheds, particularly pigsties, in which the ventilation air is supplied through openings in the ridge of the shed and is conducted away by means of ventilators through openings in the sidewalls, preferably in the dung alley of the shed. The invention relates, moreover, to a shed suitable for carrying out said method. Such a method of aerating cattle sheds is known, as well as sheds in which this method is carried into effect. Such a method has, however, the disadvantage that at the very place of the cattle very slight aeration is obtained, whilst under certain conditions, for example, in the event of strong wind or of high temperature on the outside air is drained away through the openings in the ridge of the shed, instead of fresh air being supplied through them. Such a reversal of the air stream has the disadvantage that not only the disagreeable odours of the dung alley enter the stable space itself but also a direct flow of air is produced from the dung alley towards the opening in the ridge of the roof, so that the cattle does not receive fresh air.

It has been found that in cattle sheds to which the methods described above is applied the conversion of taken fodder into an increase in weight of the cattle concerned is small and in many cases not efficient. The method according to the invention has for its object in the first place to provide the desired aeration by means of an improved aerating system, so that the efficiency of the conversion of fodder into cattle weight is found to increase to a surprisingly high extent and the invention is characterized in that the ventilation air supplied through the opening(s) in the ridge of the shed is conducted down t oa desired distance above the floor of the feeding alley of the shed, which is preferably located centrally, and that the flow of air is accelerated, whilst with or without the aid of flaps and/or slides in the separate boxes this ventilation air, whose degree of humidity and temperature are adjusted, if necessary, to the desired values, is displaced mainly in a region extending from the floor to a small height above the cattle towards the outlet opening(s).

The invention furthermore relates to a shed, particularly a pigsty for carrying out the method according to the invention.

In order to avoid the reversal of the aeration under such conditions as strong winds or high outdoor temperatures, a flap is arranged in the conventional openings in the ridge of the shed, whilst in the cylinder provided in accordance with the invention and joining the openings in the ridge of the shed in an airtight manner and terminating in the shape of a funnel at the desired level above the floor there are provided flexible strips which close the cylinder, when the flow of ventilation air reverses. The cylinder is, moreover, provided at the lower end with adjustable flaps so that a maximum opening of, for example, 30 cms. throughout the length of the shed can be made, whilst, if necessary, this opening can be reduced to any desired value. With a view to a uniform passage of air through the whole shed it is desirable to arrange the cylinder throughout the length of the shed.

The funnel-shaped end of the cylinder accelerates the air stream supplied to the shed at the outlet of the cylinder, so that a directional air jet is obtained, which penetrates down to the floor or very near the floor, when the outlet opening is arranged at the corrected height above the floor, the direction of the air stream being then changed, but being further adjustable by means of flaps and/or slides arranged in the boxes at the side of the so-called feeding alley.

In accordance with the speed and the flaps and/or slides in conjunction with openings on the other side of the boxes, that is to say at the side of the so-called dung alley, the air stream can be controlled so that it passes mainly along the cattle and/or just above the cattle. For this purpose openings are provided in the dung alley at the height of not more than one metre above the floor, whilst also the conventional run gates for the cattle are provided.

The air is sucked away by means of ventilators arranged in the outer wall of the dung alley in a conventional manner.

It has been found that under various conditions the degree of humidity and the temperature of the ventilation air have to be adjusted and this may be achieved during the supply of air through the cylinder with respect to humidity and temperature, but the humidity may also be controlled, in addition, by spraying the floor of the feeding alley, so that the evaporated water can be carried along by the air stream.

Since the air cannot flow back through the cylinder, an interruption of the current supply to the blowers will result in that no aeration at all will take place in the shed. In such cases the adjustable flaps, which form at the same time the funnel of the cylinder, can be opened to an extent such that the flexible material can no longer close the opening, whilst in the case of non-operating of the blowers openings can be made in the sidewalls through which under this condition the ventilation stream can pass in the reverse direction so that the cattle receives at any rate sufficient fresh air to remain alive.

The invention relates also to a cattle shed in which the supplied ventilation air can be conducted down to a desired distance above the floor, whilst the air stream can be accelerated and may, if desired, be adjusted to the required degree of humidity and temperature and can be guided at a desired level with respect to the floor towards outlet openings.

A further feature of the present invention consists in that the air can be supplied from the space between the double ceiling. The existing ceiling in the cattle shed is employed and a second ceiling is built in.

In the meantime it has been found that it is important for the whole quantity of air in the cattle shed to be moved, whilst a uniform temperature is maintained. The movement of the air above the pigs in the sty is allowed to be violent, but from the floor up to the height where the pigs are present the movement of the air should be slight, but nevertheless such that a satisfactory supply of fresh air is ensured. The result of these measured is that coughing does not occur with the pigs.

It has furthermore been found that the growth of the pigs is adversely affected when the temperature in the shed is maintained without the air being kept moving.

It is interesting to note that in cattle sheds in which the aeration described is employed now an increase in weight of 80 kgs. per pig requires, instead of 275 kgs. of fodder, not more than about 225 kgs. of fodder in so-called floor feeding. Similar and even more advantageous results may be obtained in future by rebuilding existing sheds in accordance with the present invention.

Figure 4:
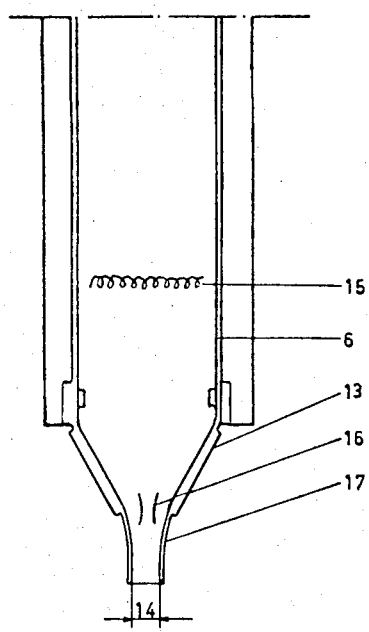
Figure 5:
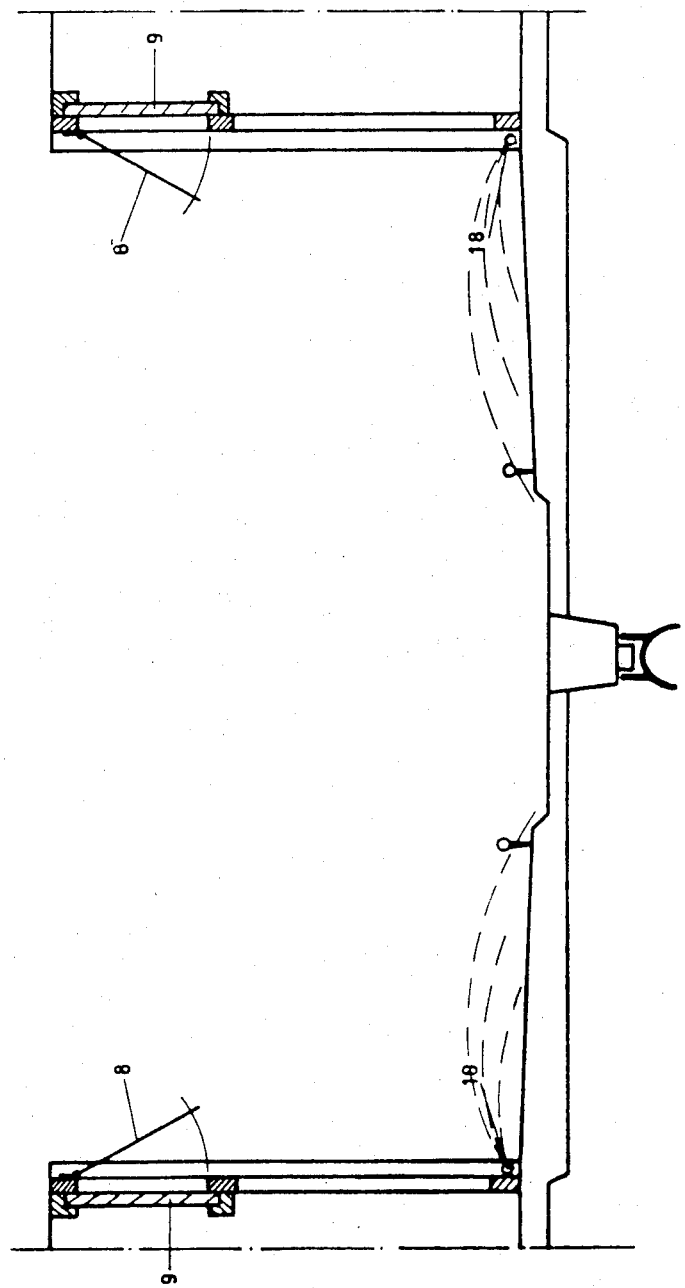
Figure 6:
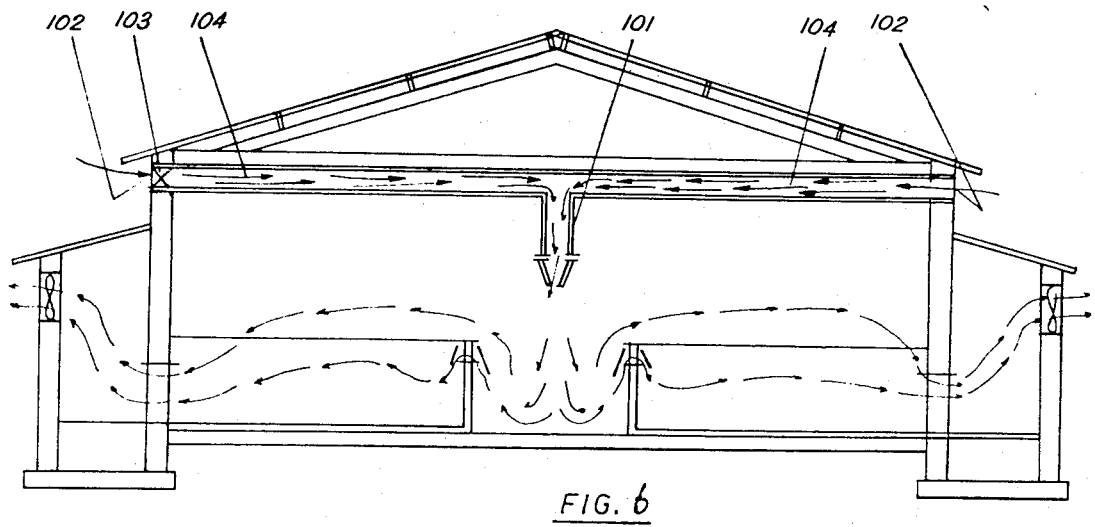
Figure 7:
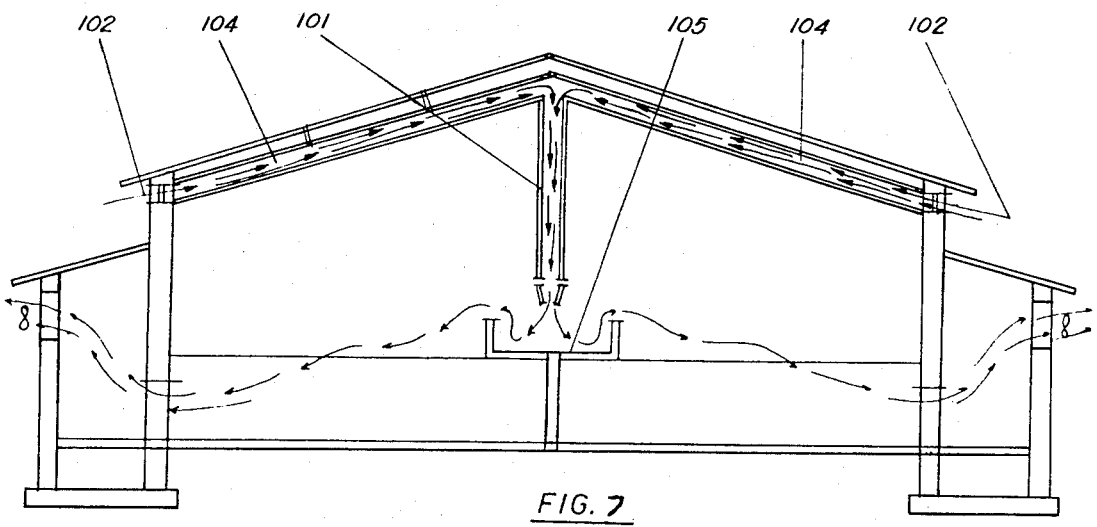
Figure 8:
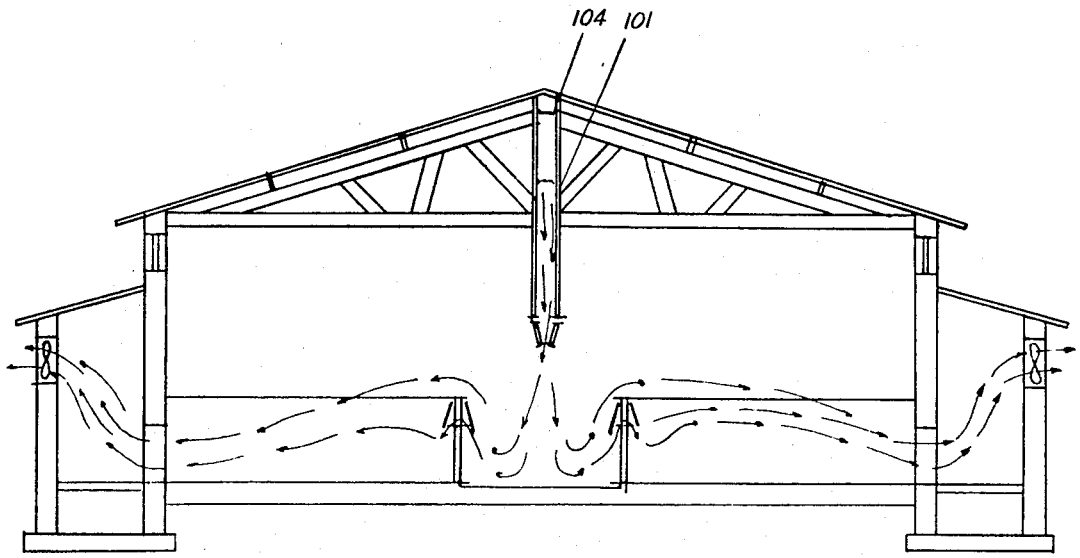
Figure 9:
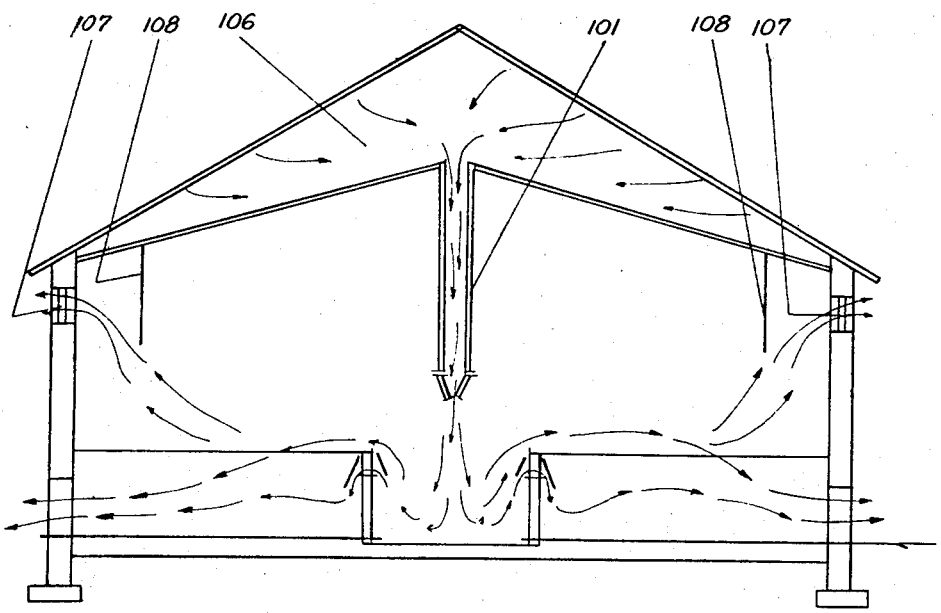
Figure 10:
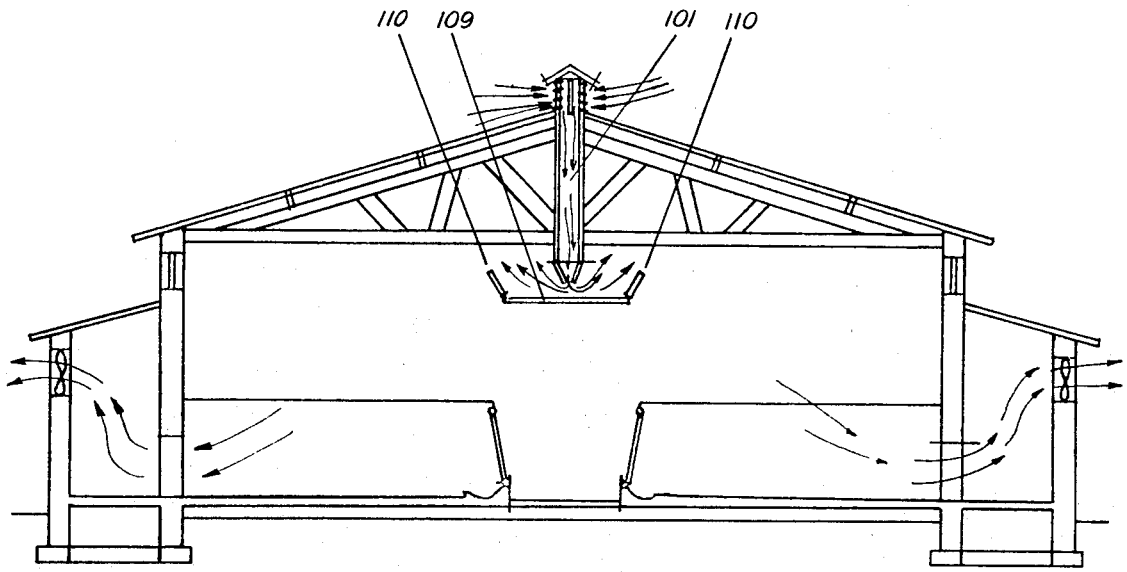
Figure 11:
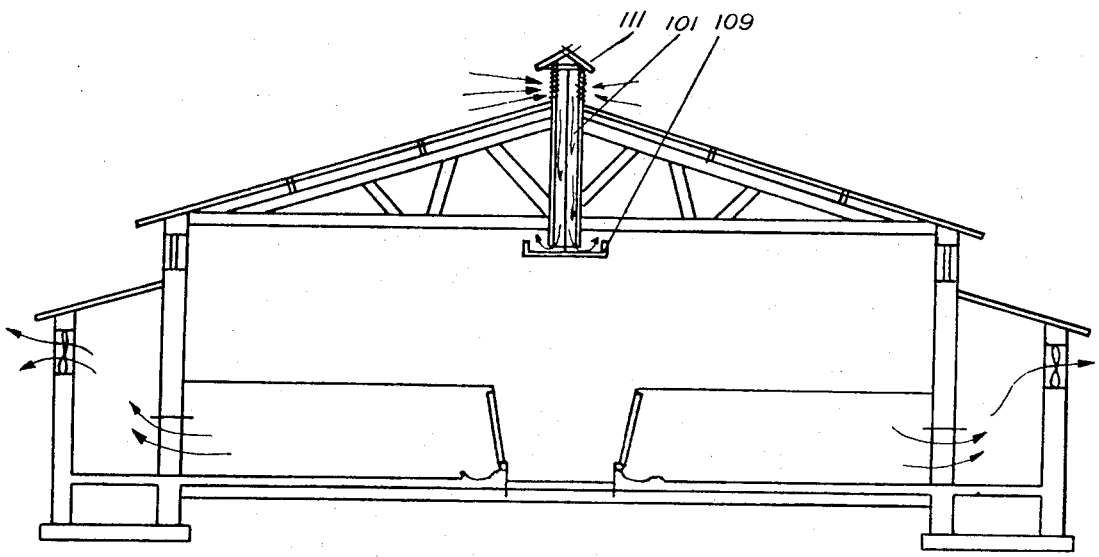

The invention will be described more fully with reference to the following figures:

FIG. 1 shows a schematic plan view of a cattle shed;
FIG. 2 is a sectional view taken on the line II—II in FIG. 1;
FIG. 3 shows the detail A of FIG. 2;
FIG. 4 shows the detail B of FIG. 2; and
FIG. 5 shows the detail C of FIG. 2.
FIGS. 6, 7 and 8 show a so-called English shed;
FIG. 9 shows a so-called Danish shed; and
FIGS. 10 and 11 show two embodiments capable of producing a more violent movement of the air in the upper portion than in the lower portion of the shed.

Referring to FIG. 1, reference numeral 1 designates a few cattle boxes and 2 designates the so-called feeding alley and 3 the so-called dung alley.

Referring to FIG. 2, reference numeral 4 denotes the known ridge with inlet openings, in which, however, control-flap 5 according to the invention is arranged, which prevents a suction effect in the event of a strong wind. Reference numeral 6 designates a cylinder extending throughout the length of the shed and joining in an airtight manner the ridge 4 with the openings and terminating below by a funnel 7.

The boxes 1 are provided with flaps 8 and slides 9 and on the side of the dung alley 3 the boxes are provided with passages 10 and, if necessary, with additional openings. The conventional blowers 11 are arranged in the outer walls of the dung alley.

For emergency cases openings 12 are provided, which are closed during the operation of the blowers 11 by means of slides or lids, which are adapted, however, to be removed automatically or non-automatically, when the blowers 11 stop operating, in which case the funnel 7 has to be opened completely.

The aeration according to the invention is performed as follows. By the suction force produced by the blowers air will be sucked in through the cylinders 6 which air is accelerated when leaving the funnel 7. Owing to this acceleration the air will continue flowing in the same direction over a given distance and when the funnel is arranged sufficiently near the floor, the direction of the air stream will change only at a short distance from the floor and the stream will take either of the two or both the paths indicated in accordance with the position of the flaps 8 and the slides 9 and leave the shed through the openings 10 by means of the ventilators 11.

It has been found that with a correct aeration the growth of the cattle is surprisingly better with respect to the fodder consumed, so that a satisfactory aeration is of major importance for the efficiency of, for example, pig breeding.

FIG. 3 shows the known ridge with openings and the novel cylinder 6, which joins the ridge so that only the air supplied through the openings is allowed to enter. In order to ensure a satisfactory supply of air under any condition a flap 5 is provided, the position of which is automatically or non-automatically adjustable, but which may preferably be suspended so that when the force of the wind increases, the openings on the other side where a suction effect might be produced are automatically closed. As a matter of course, the position of the controllable flaps 13 of the funnel 7 can, if desired, be determined by means of the position of the flap 5. With an increasing wind the opening 14 may, for example, be automatically enlarged so that the speed of flow of the ventilation air remains the same. The figure shows furthermore schematically an electric heating element 15 and the degree of humidity can be controlled by means of a Venturi tube 16.

In order to avoid a reversal of the ventilation air strips 17 of flexible material are provided, which move towards each other in the event of reversal so that the opening of the cylinder is completely closed.

FIG. 5 illustrates a different method of maintaining the desired degree of humidity of the ventilation air, i.e. by means of sprays 18 which spread the required quantity of water across the floor. FIG. 5 shows furthermore the flaps 8 and the slides 9, which may contribute to the orientation of the air stream.

As a matter of course the invention is not restricted to the present method carried out in cattle sheds having a central feeding alley; it may also be carried into effect in cattle sheds having boxes only on one side of the feeding alley.

If, for example, due to lack of electric current, the blowers 11 do not operate, an opening 12 may be provided automatically or non-automatically in the wall of the shed whilst at the same time the controllable flaps 13 are opened to an extent such that an air stream will be produced from the openings 12 towards the cylinder 6, which will operate in this case as a chimeny. It is important to take such a precaution, since otherwise, when the blowers fail to operate, the cattle in the shed will be suffocated, since no air can be supplied from any side, when the blowers stop operating, whilst the flexible parts 17 close the cylinder automatically.

In the FIGS. 6 to 11 reference numeral 6 designates the cylinder represented on FIG. 1 and the air is supplied from the openings 102, whilst, if desired, a blower 103 may be provided. The air is conducted via the cylinder 104 towards the cylinder 1.

In this manner the method according to the invention may be applied to existing cattle sheds after a little drastic reconstruction.

FIG. 7 shows a different embodiment in which the cylinders 104 are arranged along the ceiling. FIG. 7 furthermore shows a raised feeding bridge 105.

As shown in FIG. 8 the cylinders 4 are arranged in their longitudinal direction and provided, if required, with blowers.

FIG. 9 shows a cattle shed of the so-called Danish type; the air is supplied from the double ceiling 106 with or without the aid of a blower to the cylinder 102.

In the sheds of the Danish type additional precautions have to be taken to obtain a correct air circulation and for this purpose plates 8 have to be arranged at a fairly small distance from the outlet openings 7.

From FIG. 9 it will be obvious that also sheds of the Danish type can be rendered appropriate for carrying out the method described in said Dutch Patent application by a reconstruction of minor importance. As a matter of course, the solutions illustrated in FIGS. 6 to 8 may also be applied to sheds of the Danish type.

As is shown in FIGS. 10 and 11 one or more plates 109 are arranged beneath the cylinder 101 which is provided with flaps as shown in FIG. 10, which plate 9 of FIG. 10 is provided with flaps 110.

Such a plate may be advantageously used for controlling a uniform temperature, since the supplied air can be heated by controlling the temperature of the plates 109. This temperature-control may be obtained in known manner, for example, by electric heating, gas heating, by means of a so-called heat gun and so on. Such a plate may, if desired, be secured to a movable clapper 111 in the ridge, which clapper may be moved aside by the wind.

Since in this event a large supply of fresh air may be expected, which usually has a low ambient temperature, the supply will be automatically close cut off or reduced since the plate 109 narrows the passage.

The cylinder 101 may, of course, be replaced by a plurality of pipes, the results obtained in cattle sheds according to the present invention being the same.

We claim:

1. In combination with a livestock building having a floor, sidewalls, a ceiling, and a fresh air inlet, a feed alley disposed at floor level and extending from one end of the building to the opposite end thereof;

a dung alley disposed at floor level adjacent one of said sidewalls spaced laterally from said feed alley;

a row of aligned animal stalls disposed between the feed alley and the dung alley and extending between the opposed ends of the alleys;

at least one blower disposed to draw fresh air into the building from said inlet generally toward said one sidewall;

an air conduit supported above the floor, communicating with said inlet, and projecting downwardly from said ceiling with the lower outlet end of the conduit disposed in vertical alignment with said feed alley and spaced a distance above the latter, said outlet end of the conduit extending horizontally for substantially the length of the feed alley and being provided with a pair of depending, flexible flaps defining a funnel for producing an accelerated air jet which issues from the funnel and penetrates to the feed alley along the length thereof as fresh air is drawn downwardly through the conduit by said blower, said flaps being arranged to collapse together and thereby close the conduit along the length of the feed alley upon the presence of a reverse air flow in the conduit to prevent the suction of foul air from the dung alley into the stalls;

a baffle on each of said stalls adjacent said feed alley disposed to direct the sweetened air flow of said jet from the feed alley along the length thereof into a corresponding stall; and air outlets in said one sidewall extending along the dung alley and cooperating with said blower for exhausting air from the building by drawing the sweetened air flow directed into the stalls across the same transversely of the row thereof to maintain the circulation of sweet, fresh air in each stall.

2. The invention as claimed in claim 1, wherein is provided an upstanding ridge on the exterior of said building having a pair of opposed, spaced apart walls each provided with an opening defining said inlet, there being a swingable plate suspended within said ridge between said openings in disposition to swing against one of said openings to close the same when a strong gust of wind enters the opposite opening, thereby preventing reverse air flow in the conduit.

References Cited
UNITED STATES PATENTS

| | | | |
|---|---|---|---|
| 1,923,299 | 8/1933 | Darling | 137—525 |
| 532,452 | 1/1895 | Elwell | 98—119 X |
| 1,397,739 | 11/1921 | Moyer | 98—119 |
| 1,547,317 | 7/1925 | Glantzberg | 98—33 |
| 1,765,925 | 6/1930 | Lodige, Jr. | 119—16 |
| 2,939,378 | 6/1960 | Zalkind | 98—115 |
| 3,299,798 | 1/1967 | Nabben | 98—37 X |
| 3,352,225 | 11/1967 | Ffiske | 98—33 |

WILLIAM E. WAYNER, Primary Examiner

U.S. Cl. X.R.

119—16